235-382 SR

8/11/87 OR 4,686,358

United States Patent [19]

Seckinger et al.

[11] Patent Number: 4,686,358

[45] Date of Patent: Aug. 11, 1987

[54] PROGRAMMABLE ELECTRONIC-MECHANICAL REVERSING FLAT KEY INTERACTIVELY COMMUNICATABLE WITH DATA PROCESSING MEANS

[75] Inventors: Erich Seckinger, Wallisellen; Walter Gutmann, Wetzikon, both of Switzerland

[73] Assignee: Bauer Kaba AG, Wetzikon, Switzerland

[21] Appl. No.: 712,136

[22] Filed: Mar. 15, 1985

[30] Foreign Application Priority Data

Mar. 15, 1984 [CH] Switzerland ........................ 1304/84

[51] Int. Cl.[4] ............................................ G06K 19/06

[52] U.S. Cl. .................................. 235/382; 235/375; 235/492

[58] Field of Search ........................ 235/382, 375, 492

[56] References Cited

U.S. PATENT DOCUMENTS 4,200,227 4/1980 Lemelson ........................... 235/382
4,271,352 6/1981 Thomas .............................. 235/375
4,578,573 3/1986 Flies .................................... 235/492

*Primary Examiner*—Harold I. Pitts
*Attorney, Agent, or Firm*—Walter C. Farley

[57] ABSTRACT

A metal flat key with depressions arranged in the key shank for receiving radially displaceably tumbler pins located in the lock rotor for use as a mechanical key outside and as a mechanical/electronic key inside a closing means with additional electronic means arranged in the lock cylinder includes a casing (2B, 2A, 20, 21) for receiving an electronic assembly (5) and which is fixed to the key shank (1), the casing simultaneously being used as the key grip (2). The casing (2A, 2B, 20, 12) on the casing side to the key shank (1) has a connecting part (12) for receiving electric contacts (4) between grip (2) and key shank (1).

12 Claims, 14 Drawing Figures

FIG.9A
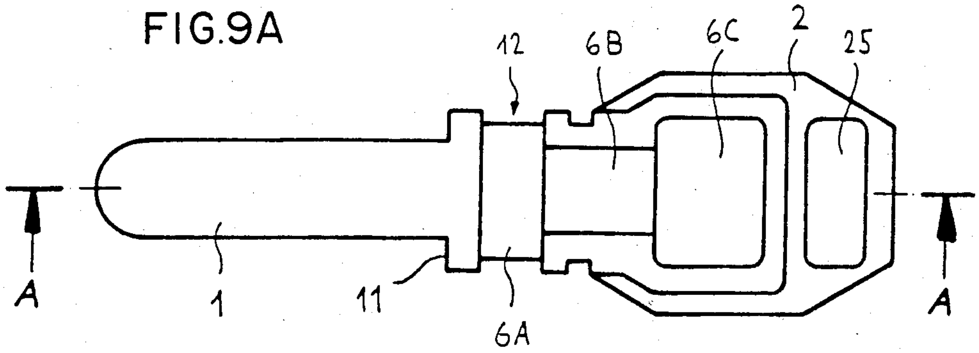
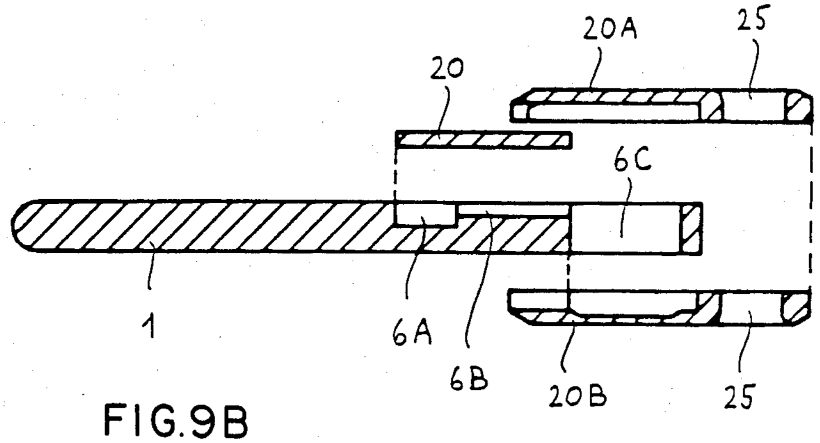
FIG.9B

PROGRAMMABLE ELECTRONIC-MECHANICAL REVERSING FLAT KEY INTERACTIVELY COMMUNICATABLE WITH DATA PROCESSING MEANS

The present invention relates to a metal electronic-mechanical flat key with depressions arranged in the key shank for receiving radially displaceable tumbler pins located in the lock rotor for use as a mechanical key outside and as a mechanical/electronic key inside a closing means with additional electronic means arranged in the lock cylinder.

BACKGROUND OF THE INVENTION

Keys with mechanical and non-mechanical closing and opening codes have formed the subject of considerable research since the appearance of electronic means, whose size is much smaller than that of valve technology-based means. However, the factual compulsions inherent in this problem are so diametrically opposed that the unavoidable compromises involved have led to solutions which generally lead away, or are even forced away from the sought objective.

For example, there are non-electronic keys which influence electronic scanning means, said keys generally being made from metal, a magnetomechanical device making such keys electronically readable. For example, such keys have a round bit profile, whose periphery houses magnetic portions or at least portions with alternating permeability, so that such keys can be electronically sensed by a rotary closing movement. Examples thereof are described in DOS Nos. 3,205,586 and 3,245,681, but these are neither flat nor electronic keys.

Thus, e.g. DE-OS No. 3,245,681 discloses a key with combined mechanical and non-mechanical, magnetic coding, said non-mechanical coding being in the form of an annular data medium. The inventor of the key described therein refers to DE-AS No. 2,325,566, which describes a flat key with non-mechanical and mechanical coding. However, this specification does not clearly state how said coding is obtained and how it is realisable. However, the reference to the fact that the magnetic key "secret" appears on the back of the key awakens the impression that it is a question of possible magnetic embedded portions distributed over the key bit length. Alternatively, it may not be a real code, but only a magnetic point on the key back which, in the correct position under the reader, releases the electrical locking system. However, the inventor of DE-OS No. 3,245,681 considers it disadvantageous to equip a flat key with non-mechanical codes, particularly because comparatively speaking only few code variants are possible. Thus, a flat key has little space for housing other than the mechanical codes provided. This is mainly due to the fact that flat keys are generally products of key miniaturization from which everything causing physical enlargement has been removed. In addition, such flat keys have become standard in their field and are still being used in increasing numbers. The factual compulsion of still incorporating further elements into a key having an optimized configuration fails due to the result of efforts lasting over many decades, namely of housing the maximum mechanical coding in the limited space of an elegant, flat key, which fits well into the pocket.

Thus, in order to achieve results in the combination of mechanical and electrical coding possibilities on the same key, it is e.g. on the one hand necessary to leave the flat key shape, as is done in DE-OS No. 3,245,681, where it is indicated as being essential to the invention, or on the other hand the mechanical coding is completely eliminated and replaced by a complicated electronic equipment, which simultaneously leads to a new key shape, so that the thus shaped keys can no longer be used in conjunction with existing standard combination locks.

Such an electronic solution is disclosed by U.S. Pat. No. 4,297,569, which describes a purely electronic "key" without mechanical coding, in which in key-like form, plastic is injected around an integrated circuit. This key has no mechanical coding and is not really a key in the conventional sense, it merely having a shape similar to a key. As stated, it comprises a DIL (dual in-line) semiconductor chip with plastic injected round it and with twice eight contact banks, the latter being used as "key contacts". The chip is embedded in the bit and the grip is developed to such an extent that the key can be correctly manipulated by the average size hand. However, the dimensions of this key are far removed from the standard dimensions of a flat key, it having the thickness required by the injection moulding of a commercially available DIL chip. The electronic key is also given its necessary stability by this thickness.

SUMMARY OF THE INVENTION

An object of the present invention is therefore to provide a flat key with mechanical and electronic coding which, apart from its dimensions corresponding to the standard flat key, has a comparatively complicated electronics and is also constructed so that it permits a data exchange between the key and the associated cylinder, whilst according to a special embodiment the flat key is a reversing key. The flat key must also be usable in existing lock cylinders not belonging to an electronic-mechanical closing means, which presupposes that said key has the standard dimensions for mechanical coding. It must naturally also have the necessary adequate mechanical strength of conventional flat keys.

It is obvious that in flat keys with the usual standard size, it is not possible to house adequate magnetomechanical means for security purposes or electronic means using the known measures, particularly if the flat key is to be made from metal for stability reasons, because then special insulation problems occur which are not dealt with e.g. in the solution according to U.S. Pat. No. 4,297,569.

The problem is solved in that the flat key of the aforementioned type is constructed as a casing for electronic assemblies and not as a key, whilst in an extension to the key shank towards the grip and/or in the actual grip, there is provided at least one recess for receiving an electronic circuit and in the area between the key shank and the key grip on at least one narrow side is provided a contact bank connected to the electronic circuit housed in the recess.

Various embodiments are defined in the dependent claims. Thus, e.g. in a special embodiment, the integrated circuit and the contact bank are combined on a printed circuit board to form an independent assembly, whilst the elements connected by means of the printed circuit, the integrated circuit and contact bank or banks spaced therefrom has a separate assembly from the casing in key form can be used for testing the key body for its satisfactory electronic functioning characteristics prior to the assembly to give the finished key.

According to a further embodiment, a modular, splittable key grip is provided comprising a part connected to the key shank and a part removable and reconnectable with respect to the key.

Further embodiments derived from these special embodiments are defined in additional dependent claims.

BRIEF DESCRIPTION OF THE DRAWINGS

The invention is described in greater detail hereinafter relative to the following drawings, wherein:

FIGS. 9*a* and 9*b* are top plan and exploded sectional views, respectively, of a further embodiment of a casing shape.

DESCRIPTION OF THE PREFERRED EMBODIMENTS

Figure 1:
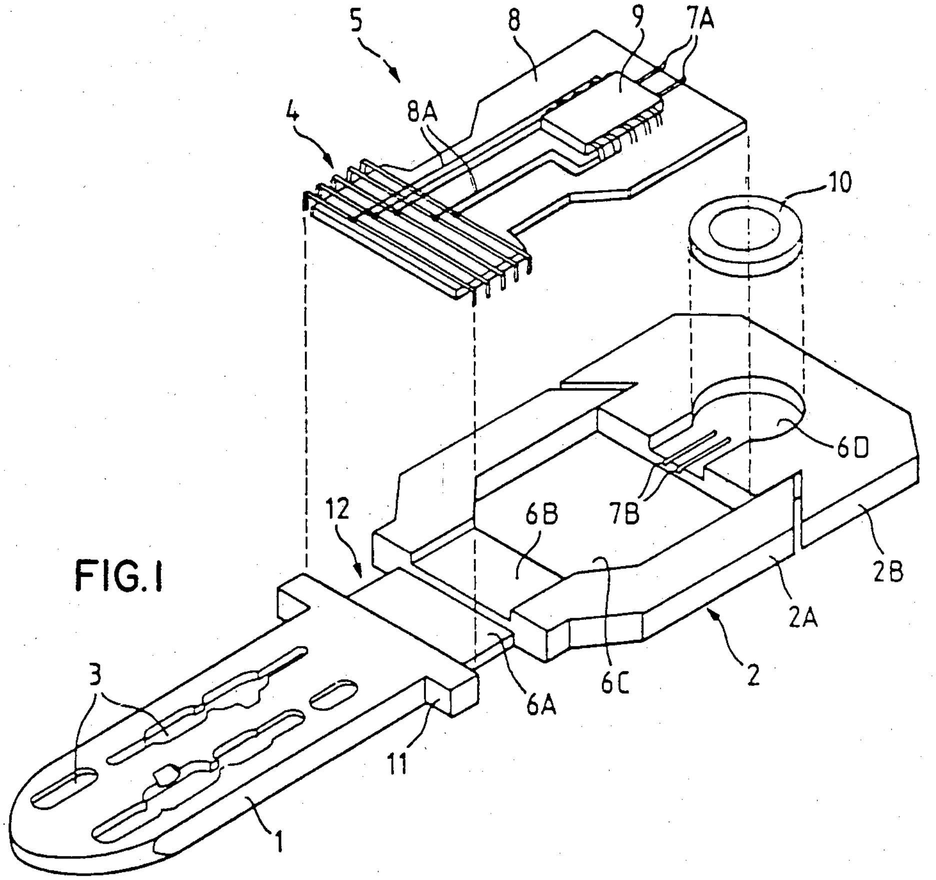
FIG. 1 is an exploded view of the key according to the invention in a practical embodiment.

FIG. 1 attempts to show an embodiment which not only makes the features of the invention apparent but also the actual inventive idea. It is certainly contrary to the feelings and efforts of the expert in the field to consider and use his refined product, i.e. the key, as a casing for a novel, additional element. The key is clearly divided up into novel components, which are completely foreign to keys and only when assembly takes place is a flat key of the conventional configuration obtained. Thus, contrary to what might appear from superficial consideration, it is not merely a question of hollowing out an existing key for the purpose of housing the electronic components and instead, within the scope of a standardized flat key configuration a casing is obtained which receives the electronics, can be closed or sealed and in this form constitutes a mechanical-electronic flat key and, according to FIG. 1, a reversing key.

Figure 6:
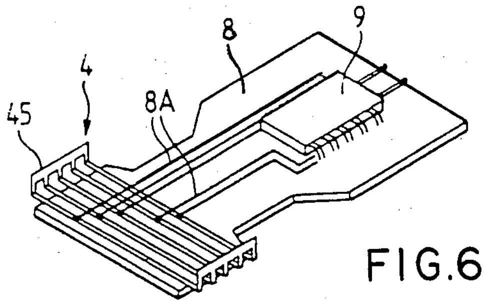
FIG. 6 is a perspective view of an embodiment of the electronic assembly which can be inserted in the casing.

The represented reversing key has the typical main elements for such a key, namely the key shank 1 with the depressions 4 which form the mechanical coding, the key grip 2 and a connecting part 12 especially designed for parts 1 and 2, which is always present usually in rudimentary form. In this case, there is a marked extension of the connecting part between the grip and the shank and it is shaped so as to fit the contact means 4. Contact means 4 with the individual contacts is arranged in an assembly 5 for the electronic coding. Assembly 5 essentially comprises a circuit board 8 with printed conductors 8A, the contact means 4 and electronic components, in this case an integrated circuit, a chip and further contacts 7A. With regards to the functional construction of assembly 5, a considerable degree of freedom, including spatial freedom exists, because within certain limits the grip thickness can be modified, without significantly modifying the typical configuration of the key. For ease of viewing purposes, the IC component 9 is indicated on the top of the circuit board (actually incorrect). FIG. 6 shows the embodiment in the way in which it is used.

Figure 2A:
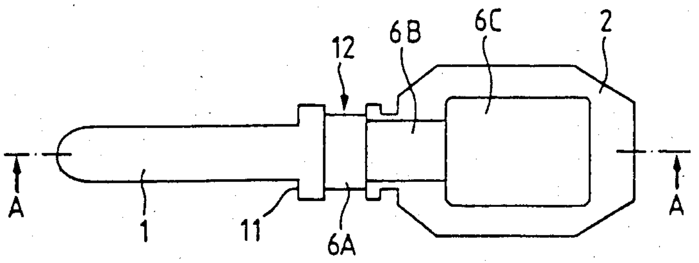
FIGS. 2*a* and 2*b* are top plan and exploded sectional views, respectively, of a first casing shape with one-part key grip for the electronic assembly shown in FIG. 1.
Figure 2B:
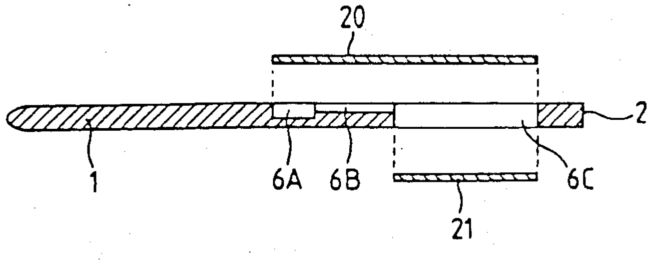
Figure 3A:
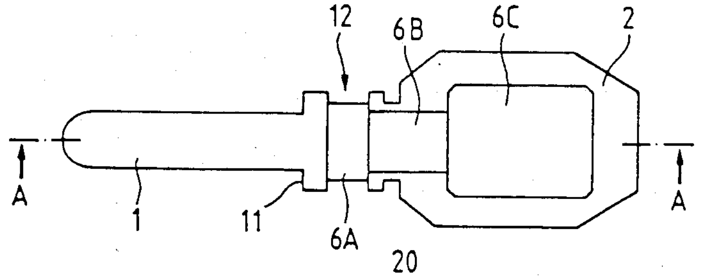
FIGS. 3*a* and 3*b* are top plan and exploded sectional views, respectively, of a second casing shape with a two-part key grip for the electronic assembly shown in FIG. 1.
Figure 3B:
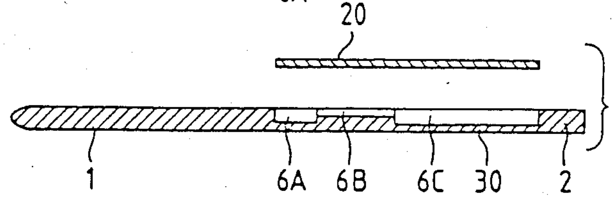

Assembly 5 can be inserted in the prepared casing and has the following recesses for this purpose. A recess 6A is formed in connecting part 12 for receiving the contact means 4, a recess 6B is formed in the front grip part, i.e. the part closest to the key shank for passing through part of the circuit board 8, and a recess 6C is formed in the front grip half for receiving the remainder of assembly 5. The obviously necessary covers, one at the top and one at the bottom are shown in FIGS. 2*a* and 2*b* which shows a casing only.

Grip 2 in FIG. 1 comprises a part 2A fixed to the key shank 1 and a removable, modular part 2B, which can be constructed in numerous different ways. In FIG. 1, part 2B has a further recess 6D in which can be placed a power supply in the form of a battery 10, which is in turn connected to contact 7B. Thus, the modular part 2B of grip 2 constitutes a power supply part for assembly 5, which is coupled to the fixed grip part 2A and by means of contact pair 7A/7B energizes the key. As the modular part is fixed to the grip in a standard precision engineering manner, no details thereof will be given here.

The splitting up of the key grip 2 into a fixed part 2A and a modular part 2B constitutes a special embodiment, which makes it possible e.g. to individualize the key by inserting numbers, marks, etc, to functionally extend the key with further interchangeable functional element and to use the key as a selectable advertising medium, the individual advertisement being applied to the modular part, etc.

Figure 4A:
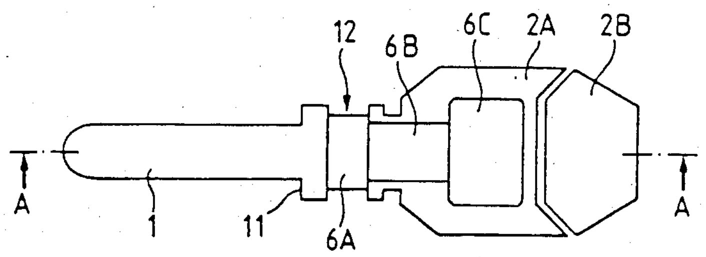
FIGS. 4*a* and 4*b* are top plan and exploded sectional views, respectively, of a further emobodiment of a casing shape with a two-part key grip, the removable part being constructed as a modular part.
Figure 4B:
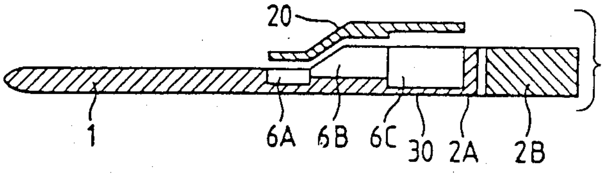
Figure 5A:
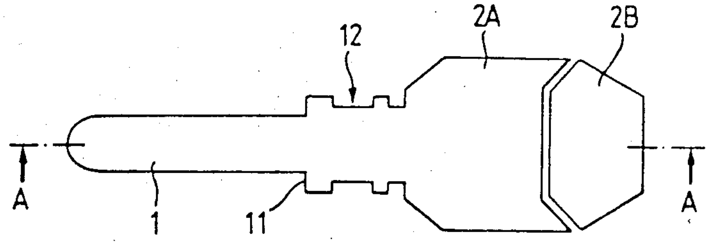
FIGS. 5*a* and 5*b* are top plan and exploded sectional views, respectively, of a further embodiment derived from the shape shown in FIG. 4.
Figure 5B:
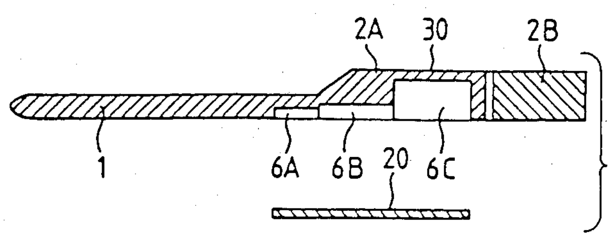

FIGS. 2*a*, 2*b*, 3*a*, 3*b*, 4*a*, 4*b* and 5*b* show various casing shapes, while FIGS. 4*a* and 5*a* show different modular parts.

The simplest casing configuration is shown in FIG. 2*a* from above and in section in FIG. 2*b* from the side. Following onto the key shank 1, which naturally does not carry the mechanical coding on manufacture, is provided the conventional key stop 11. This is followed by connecting part 12 with the first recess 6A, in which can be placed the contact means 4. The following depression 6B is in the form of a flat channel for receiving the circuit board 8 of assembly 5, which finally issues into recess 6C, which here takes up the largest part of grip 2, in which is then housed the electronic components, e.g. chip 9. Recess 6C passes through the entire thickness of grip 2, i.e. for closing the casing two covers are required, namely a lower cover 21 for recess 6C and a correspondingly shaped upper cover 20 for simultaneously closing recesses 6A, 6B and 6C. The details of the way in which the covers are fitted or inserted are not shown, known precision engineering measures offering numerous possibilities. It can normally be assumed that once the casing is closed it is not opened again. This is e.g. the case if an electronic assembly 5 according to FIG. 1 is used, in which the contact means 4 is non-detachably connected to the middle part 12. It is then only possible with difficulty to replace the electronics, e.g. in the case of repairs. If particular significance is attached to an inexpensive construction, it is recommended that the covers be pressed in as an undetachable connection and are additionally bonded.

In the case of this construction mode, the key/casing blank can be easily produced, namely by punching, which also applies to the covers. The depressions 3 for the mechanical coding are then milled onto the key shank of the blank, the electronic assembly being subsequently fitted. Normally, the "electronics" of the assembly is to a certain extent neutral and is programmed for the specific customer prior to use. This is not the case with mechanical coding, which is not easily interchangeable. It is therefore recommended that the mechanical coding be hierarchically placed as low as possible, so that a maximum number of keys of an organisation group are "mechanically identical, but electrically different".

In a modification of the casing shape of FIGS. 2*a* and 2*b*, FIGS. 3*a* and 3*b* show a casing whose recess 6C does not extend through the entire thickness of grip 2. It is made sufficiently thick that there is sufficient space for the assembly and a casing base 30 is retained. This saves manipulation with the lower cover 21, so that the key merely comprises the casing, electronic assembly and cover, said casing also being manufacturable by punching or stamping. Inner edges and shoulders need not be as marked as obtainable, e.g. by milling.

This casing shape, i.e. the casing part with covers and assembly to be housed therein leads to major advantages. If, in accordance with the inventive idea, it is possible to get away from the idea of considering a key and instead of looking upon it as a casing, with a key shank fitted thereto in the manner of a handle, then sudden free mental access is obtained to the stylistic elements of similar casings, such as e.g. watch cases and their closure possibilities. It is obvious that for economic considerations, the solutions adopted there could only rarely be used as such, but when appropriately adapted the measures known therefrom can indeed be transferred.

An example of such a case is shown in part in FIGS. 4*a* and 4*b*, where a one-sided, non-symmetrically thickened casing with prismatic bevels on the edges gives the appearance of a watch. This measure of one-sided thickening gives sufficient space in the grip recess 6C, in order to be able to house electronic assemblies for the highest demands. Recess 6B also has sufficient space to provide detachable contacts between contact means 4 and assembly 5, so that the latter can be interchanged alone. As absolute security is not vital, it is unimportant that the cover 20 can be removed as in the case of a watch. Because on removing the cover and manipulating the assembly at the most the non-functioning of the key occurs, the key user is probably as uninterested in opening his complicated key as he is in opening his watch. However, if a non-detachable closure is considered necessary, it is possible to use methods as discussed in connection with the preceding drawings.

FIGS. 4*a* and 4*b* again show the construction of the split grip according to FIG. 1, where there is a fixed part 2A and a modular part 2B. This extended casing technology permits an element interchange, without having to enter the interior of the casing. Thus, the modular part 2B is the relatively easily interchangeable support for functional elements or marks. Functional elements would be power supplies, additional assemblies, etc. and marks would be room numbers for hotel keys, advertisements or single carat diamonds as advertising gifts, etc. This modular part is then fixed to the stationary grip part 2A by insertion, mounting with a clip or pin or screw attachment.

FIGS. 1 to 4 all relate to reversing keys, so that the contact means 4 is constructed in such a way that it engages around the two narrow sides of the connecting part, but this is obviously not necessary. A bit key, which is actually not a reversing key, can be given the same casing technology, the contacts of a one-sided contact means merely being arranged on the transition part of the key back.

Assembly 5 in FIG. 1, as already described, comprises a circuit board as a support and a connecting element for the electronic components and the contact means contacting the outside. FIG. 6 shows it in the embodiment as used. Advantageously, a flexible circuit board 8 with corresponding insulating varnishes is used for this construction. The electronic component 9 is a DIL IC with 16 legs. The printed conductors 8A are formed by etching from the flexprint coating. The contact means 4 is produced by punching or stamping. The necessary connecting web 45 is left as a shorting link on the contact means during storage and the fitting of the assembly into the casing and consequently protects the contacted IC against the influences of static electricity. It has also proved unnecessary to insulate the interior of the casing, if the actual assembly is adequately insulated.

Figure 7:
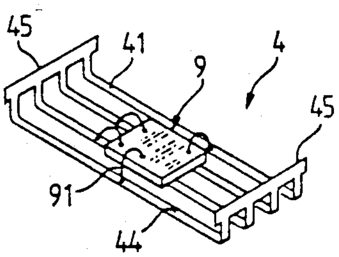
FIG. 7 is a perspective view of another embodiment of the electronic assembly.

FIG. 7 shows a different embodiment of the electronic assembly. The contact means 4, in this case with four contacts, has the same construction as described hereinbefore. The electronic component 9 is a silicon wafer with the integrated circuit, a chip. This chip is bonded to the contact means in direct manner with contact wires. A varnish coating can be used between the chip and the means for mechanical damping and electrical insulation. The contact means is placed in the casing in the usual way, chip 9 being housed in recess 6A. The other recesses can either be used for other purposes or can be omitted.

Figure 8:
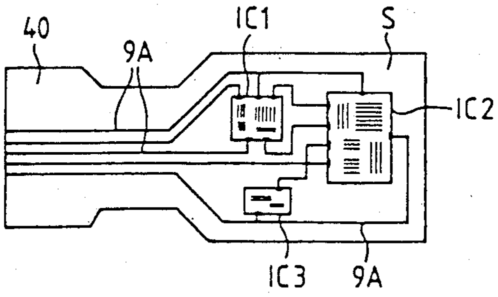
FIG. 8 is a top plan view of another embodiment of the electronic assembly.

FIG. 8 shows an electronic assembly which can be designed in a very universal manner. One, two, three or more IC's can be directly bonded to a substrate S, which can be a small ceramic plate or a rigid or flexible circuit board of the corresponding size. In this example, there are three IC's which are in contact with one another and the outside. FIG. 8 logically only shows one for illustrating the thus formed imaginary circuit. However, it is intended to show that in reality IC 2 can be an eight bit processor and the other two IC1 and IC3 can be its periphery which interchange data via means 9A. The size of such a processor assembly falls within the scope within which electronic components can be housed in a key with the aid of the discussed casing technology. The electronic assembly shown in FIG. A still has not contact means 4. This is soldered onto part 40 and the resulting finished assembly is housed in its casing.

FIG. 9 finally shows a special casing configuration for the discussed electro-mecanical key of which the key grip 2 has a hole or passage 25 for attachment to a ring for a bunch of keys. The casing is divided into four parts: a first part comprising the key shank 1 and the portion with the recesses 6A,6B,6C for electrical contact means, circuit carrier with conductors and the electronic components; then a second part which comprises a cover 20 for simultaneously closing recesses 6A and 6B and finally a third and a fourth part forming a double shell cover 20A/20B (e.g. like an oyster). Between the covers is placed the first key shank part with the recesses so that joining the shell covers the electronic key portion, closes recess 6C and simultaneously forms key grip 2 with the hole or passage 25. The shell covers can be joined and fixed in known manner e.g. it can be tightly held by clip fastening or glued by metal cement. For certain applications the shell covers can be made of plastic or any other suitable material so that it can be joined also in a thermal process.

What is claimed is:

1. A mechanical and electronic flat key for use in combination with a lock of the type having a rotor, a key slot, means for performing a mechanical locking-/unlocking function and an electronic locking/unlocking function and electrical conductors extending between and interconnecting said slot and said means for performing said electronic locking/unlocking function, the key comprising the combination of a key shank dimensioned to be insertable into the lock rotor key slot for driving said rotor;

a key grip;

an intermediate portion fixedly attached to and mechanically interconnecting said shank and said grip on opposite sides of side intermediate portion;

means on said shank defining mechanical coding for cooperating with said means in said rotor for performing said mechanical locking/unlocking function of said lock;

an electronic coding circuit for cooperating with said means in said rotor to perform said electronic locking/unlocking function of said lock;

means defining a recess in said grip for receiving said electronic coding circuit;

circuit means electrically connected to said coding circuit having contact members for making electrical contact with conductors in said rotor to permit transmission of electrical signals between said coding circuit and said means in said rotor controlling said electronic locking/unlocking function; and means defining a recess in said intermediate portion for receiving said circuit means with said coding circuit in said grip recess and for holding said contact members in proper position to engage said electrical conductors in said rotor when said key is in said slot.

2. A key according to claim 1 wherein said circuit means includes a flexible circuit board.

3. A key according to claim 2 wherein said grip includes a portion permanently attached to said intermediate portion and a removable and reconnectable end portion.

4. A key according to claim 3 wherein said removable and reconnectable end portion carries a battery for supplying said coding circuit.

5. A key according to claim 3 wherein said removable and reconnectable end portion carries said coding circuit.

6. A key according to claim 3 wherein said removable and reconnectable end portion carries a part of said coding circuit.

7. A key according to claim 3 wherein said removable and reconnectable end portion comprises an interchangeable module for identifying said key.

8. A key according to claim 3 wherein said removable and reconnectable end portion comprises an electronic clock with an LED display.

9. A key according to claim 2 wherein said coding circuit, said circuit means and said contact members form a separate assembly from said grip and said intermediate portion, said separate assembly being joinable to said grip and intermediate portion.

10. A key according to claim 9 wherein said coding circuit includes a random access memory for receiving data from said means in said rotor for performing said electronic locking/unlocking function.

11. A key according to claim 10, wherein said grip includes a portion permanently attached to said intermediate portion and a removable and reconnectable end portion carrying a battery for supplying said coding circuit, said random access memory being erasable when said battery is removed.

12. A key according to claim 9 wherein said separate assembly is shaped and dimensioned to be received in said recesses in said grip and said intermediate portion.

* * * * *